(12) United States Patent
Wang et al.

(10) Patent No.: US 12,265,577 B2
(45) Date of Patent: Apr. 1, 2025

(54) KNOWLEDGE GRAPH MANAGEMENT BASED ON MULTI-SOURCE DATA

(71) Applicant: EMC IP Holding Company LLC, Hopkinton, MA (US)

(72) Inventors: Zijia Wang, WeiFang (CN); Victor Fong, Medford, MA (US); Zhen Jia, Shanghai (CN); Jiacheng Ni, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 938 days.

(21) Appl. No.: 17/230,433

(22) Filed: Apr. 14, 2021

(65) Prior Publication Data

US 2022/0335307 A1 Oct. 20, 2022

(51) Int. Cl.
*G06F 16/903* (2019.01)
*G06F 40/30* (2020.01)

(52) U.S. Cl.
CPC ........ *G06F 16/90335* (2019.01); *G06F 40/30* (2020.01)

(58) Field of Classification Search
CPC ........... G06F 16/9024; G06F 16/90335; G06F 40/30; G06N 5/02
See application file for complete search history.

(56) References Cited

U.S. PATENT DOCUMENTS

| 11,354,325 | B2* | 6/2022 | Ogrinz | G06F 16/248 |
| 11,768,888 | B2* | 9/2023 | Zhuang | G06F 16/951 |
| | | | | 707/709 |
| 2022/0075948 | A1* | 3/2022 | Yuan | G06N 20/00 |
| 2022/0301173 | A1* | 9/2022 | Cheng | G06F 18/22 |
| 2022/0327356 | A1* | 10/2022 | Rossiello | G06N 3/045 |

OTHER PUBLICATIONS

F. Pascual, "Introduction to Topic Modeling," https://monkeylearn.com/blog/introduction-to-topic-modeling/, Sep. 26, 2019, 39 pages.
S. Li, "Topice Modeling and Latent Dirichlet Allocation (LDA) in Python," https://towardsdatascience.com/topic-modeling-and-latent-dirichlet-allocation-in-python-9bf156893c24, May 31, 2018, 12 pages.

(Continued)

*Primary Examiner* — Angela A Armstrong
(74) *Attorney, Agent, or Firm* — Ryan, Mason & Lewis, LLP

(57) ABSTRACT

Techniques for constructing and otherwise managing knowledge graphs in information processing system environments are disclosed. For example, a method comprises the following steps. The method collects data from a plurality of data sources. The method extracts structured data and unstructured data from the collected data, wherein unstructured data is extracted using an unsupervised machine learning process. The method forms a plurality of sub-graph structures comprising a sub-graph structure for each of the data sources based on at least a portion of the extracted structured data and unstructured data. The method combines the plurality of sub-graph structures to form a combined graph structure representing the collected data from the plurality of data sources. The resulting combined graph structure is a comprehensive knowledge graph.

20 Claims, 11 Drawing Sheets

(56) References Cited

OTHER PUBLICATIONS

M. Kelechava, "Using LDA Topic Models as a Classification Model Input," https://towardsdatascience.com/unsupervised-nlp-topic-models-as-a-supervised-learning-input-cf8ee9e5cf28, Mar. 3, 2019, 17 pages.
H. L. Nguyen et al., "Knowledge Graph Fusion for Smart Systems: A Survey," Information Fusion, vol. 61, Mar. 31, 2020, pp. 56-70.

* cited by examiner

KNOWLEDGE GRAPH MANAGEMENT BASED ON MULTI-SOURCE DATA

FIELD

The field relates generally to information processing systems, and more particularly to management of knowledge graphs in such systems.

BACKGROUND

The emergence of technologies such as, but not limited to, big data, Internet of Things, and artificial intelligence has caused a proliferation of enormous volumes of data. However, techniques for efficiently capturing, analyzing and/or presenting such a large amount of data presents significant challenges to information processing systems that employ the above and other data-intensive technologies.

SUMMARY

Illustrative embodiments provide techniques for constructing and otherwise managing knowledge graphs in information processing system environments.

For example, in an illustrative embodiment, a method comprises the following steps. The method collects data from a plurality of data sources. The method extracts structured data and unstructured data from the collected data, wherein unstructured data is extracted using an unsupervised machine learning process. The method forms a plurality of sub-graph structures comprising a sub-graph structure for each of the data sources based on at least a portion of the extracted structured data and unstructured data. The method combines the plurality of sub-graph structures to form a combined graph structure representing the collected data from the plurality of data sources. The resulting combined graph structure is a comprehensive knowledge graph.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide an unsupervised machine learning-based data fusion methodology that combines information from multiple data sources into a knowledge graph structure that is usable to, inter alia, report current trends and/or future trend predictions.

These and other illustrative embodiments include, without limitation, apparatus, systems, methods and computer program products comprising processor-readable storage media.

DETAILED DESCRIPTION

Figure 1:
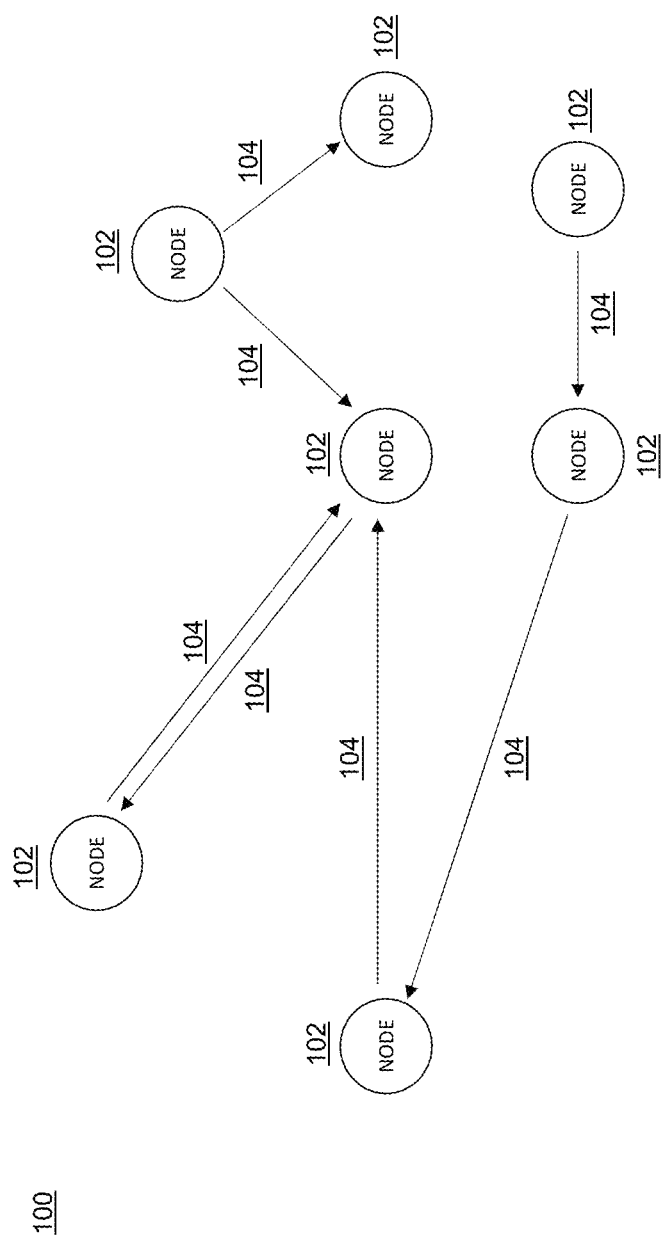
FIG. 1 illustrates the concept of a knowledge graph with which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources. Cloud-based systems may include one or more public clouds, one or more private clouds, or a hybrid combination thereof.

As various technology industries are moving quickly on innovation, new research, products, services, and announcements are coming out at a fast pace. It is realized herein that by utilizing data-gathering automations and techniques of natural language processing and/or other techniques, evaluation and analysis of technology trends can be enabled systematically and holistically at a macro-level. Reports can be generated on a regular basis (e.g., monthly or quarterly) to help companies and their technology teams in understanding current technology trends. This would enable such companies to make data-driven decisions, stay focused on important material and thereby reduce time in gathering and digesting information, and reduce human bias and evaluate industry trends holistically. It is further realized herein that to achieve such goals, a knowledge graph as a representation of a set of data is a superior choice. However, no satisfactory knowledge graph currently exists, and constructing knowledge graphs is a challenging task. Therefore, illustrative embodiments propose a methodology to construct an improved knowledge graph in an unsupervised manner.

Recognizing the importance of knowledge for human existence, extensive research has focused on defining and designing conceptual models in its representation. Humans excel at observing, interpreting, and understanding their surroundings, whereas machines require additional knowledge representation to perform all these tasks and behave in an intelligent manner. To this end, the concept of taxonomies emerged. A taxonomy represents a simple hierarchical relationship between concepts and their labels (e.g., parent-child relationship); however, it cannot depict restrictions on properties at any level. To overcome this problem, the concept of ontologies emerged. An ontology is an extension of taxonomy and captures and describes knowledge as concepts and entities using multiple classes, relationships, and constraints. Hence, ontology is capable of efficiently recording complex structures and schema in particular domains. The concept of ontology has been widely used in artificial intelligence and machine learning (AI/ML) research.

FIG. 1 illustrates an example of a knowledge graph 100. There are two main elements in a knowledge graph, i.e., nodes and edges. As shown in knowledge graph 100, nodes 102 are interconnected via one or more edges 104. Each node 102 represents an entity (e.g., topic, person, process, etc.) and edges 104 represent relationships between such entities. A given edge 104 can be directional (i.e., unidirectional arrow(s) or a bi-directional arrow) to illustrate, for example, information flow, sequencing, etc. between the entities, depending on the nature of the specific relationships between entities. A given edge 104 can also be non-directional (i.e., interconnecting line with no arrows), again depending on the specific relationships between entities.

A knowledge graph, such as knowledge graph 100 depicted in FIG. 1, is constructed emphasizing the essence of knowledge representation and semantic data. A knowledge graph can be built on top of one or more databases and serves to connect the data from the one or more databases together. Such data may include both structured and unstructured data (e.g., text, numbers, and geometries). Thus, for example, a knowledge graph represents data using a graph model where nodes 102 represent entities or raw values encoded as literals, and semantic relationships are depicted by edges 104. A knowledge graph also slightly resembles an ontology, however, they are not identical. That is, a knowledge graph acquires and integrates information into an ontology and applies a reasoner to derive new knowledge. This brings essential and valuable advantages for capturing underlying knowledge from data-intensive technologies. With the swift development of such cutting-edge technologies (e.g., big data, Internet of Things (IoT), artificial intelligence (AI), and cloud computing), systems generate large quantities of data of different types including, but not limited to, mass media data, social media data, and sensor data. However, big data itself is incomprehensible until processed to extract useful information. With the support of a knowledge representation, particularly knowledge graphs, correlations can be discovered across different objects from different big data sources, semantic connections can be constructed between these objects, and big data can be effectively turned into usable knowledge. Knowledge graphs can help in improving the quality, productivity, and adaptability of the decision-making process in an extensive number of different applications.

Illustrative embodiments address the above and other challenges by constructing a comprehensive knowledge graph from multi-source data. While embodiments are not limited to any specific data sources, a running example will be given in the context of an illustrative use case wherein data sources include scientific papers, weblogs (blogs) and program code to cover information in one or more technical areas. In one illustrative use case, an arXiv database is considered a scientific paper data source, a Medium database is considered a blog data source, and a GitHub database is considered a program code data source.

More particularly, arXiv is an open-access repository of electronic preprints (known as e-prints) approved for posting after moderation, but not peer review. The repository consists of scientific papers in the fields of mathematics, physics, astronomy, electrical engineering, computer science, quantitative biology, statistics, mathematical finance and economics, which can be accessed online. In many fields of mathematics and physics, almost all scientific papers are self-archived on the arXiv repository before publication in a peer-reviewed journal. The arXiv.org database has over a million paper submissions.

Medium is an online publishing platform that is an example of social journalism hosting a hybrid collection of amateur and professional contributors of blogs or other publications. The Medium platform was originally developed as a means to publish writings and documents longer than Twitter's 140-character (now 280-character) maximum.

GitHub provides hosting for software development and version control using Git which tracks changes in any set of files and is typically used for coordinating work among programmers collaboratively developing source code during software development. GitHub offers the distributed version control and source code management (SCM) functionality of Git, plus its own features. Further, GitHub provides access control and several collaboration features such as bug tracking, feature requests, task management, continuous integration and wikis for software development projects. GitHub reports having over 40 million users and more than 190 million repositories (including at least 28 million public repositories), making it the largest host of source code in the world.

Other data sources can be part of the multi-source data environment for which a knowledge graph is constructed including, but not limited to, Quora which is question-and-answer website where questions are asked, answered, followed, and edited by Internet users, either factually or in the form of opinions. Many other sources of data may be used in the construction of a knowledge graph.

In the context of the vast amount of data from the above multiple data sources, illustrative embodiments perform techniques including, but not limited to, topic modeling which is an unsupervised machine learning technique that is configured to scan a set of documents, detect word and phrase patterns within the documents, and automatically cluster word groups and similar expressions that best characterize a set of documents. Latent Dirichlet Allocation (LDA) is an example of topic modeling and is used to classify text in a document to a particular topic. LDA builds a topic per document model and words per topic model, modeled as Dirichlet distributions.

Figure 2:
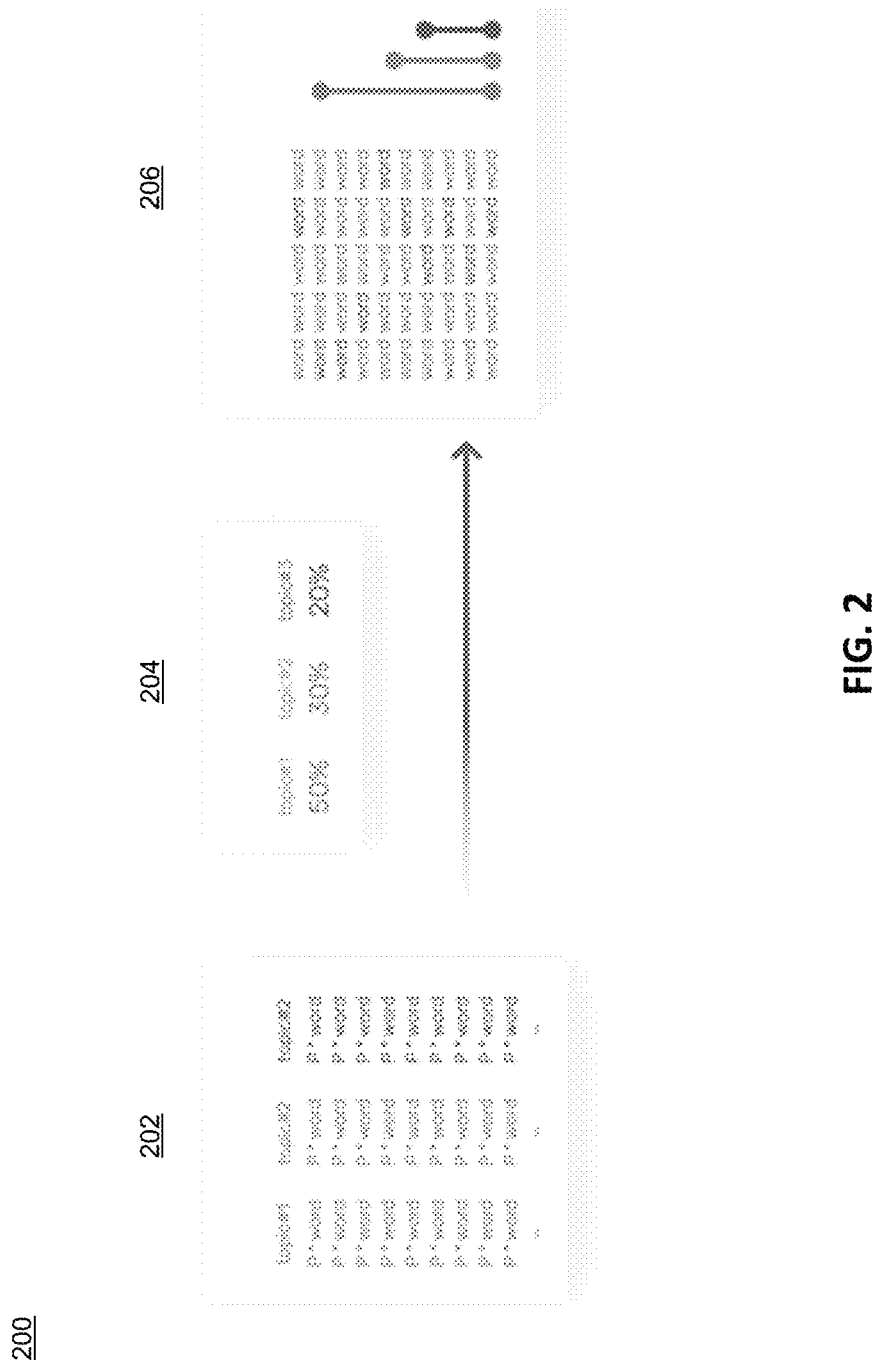
FIG. 2 illustrates a topic modeling approach with which one or more illustrative embodiments can be implemented.

FIG. 2 illustrates a topic modeling approach 200 based on LDA. As shown, a document with multiple topics and words represented as 202 has a specific percentage distribution 204 of topics whereby each topic is a distribution of words represented as 206.

It is realized herein that to construct a knowledge graph, there are mainly two challenges. One challenge is that existing knowledge graphs are narrowly constructed to address problems for specific scenarios. These problems may only be found in the specific scenarios. Thus, if the corresponding solution is to be used in another knowledge graph construction scenario, some modifications are necessary. A second challenge is how to combine data from multiple, and likely disparate, data sources. It is realized herein in accordance with illustrative embodiments that when different data sources have to be combined without labels, an unsupervised machine learning method can be used to combine the data into one comprehensive knowledge graph. Furthermore, it is realized herein in accordance with illustrative embodiments that, because of complex node attributes, a new node embedding process is needed to encode the information inside the nodes of the knowledge graph considering the node attributes.

Figure 3:
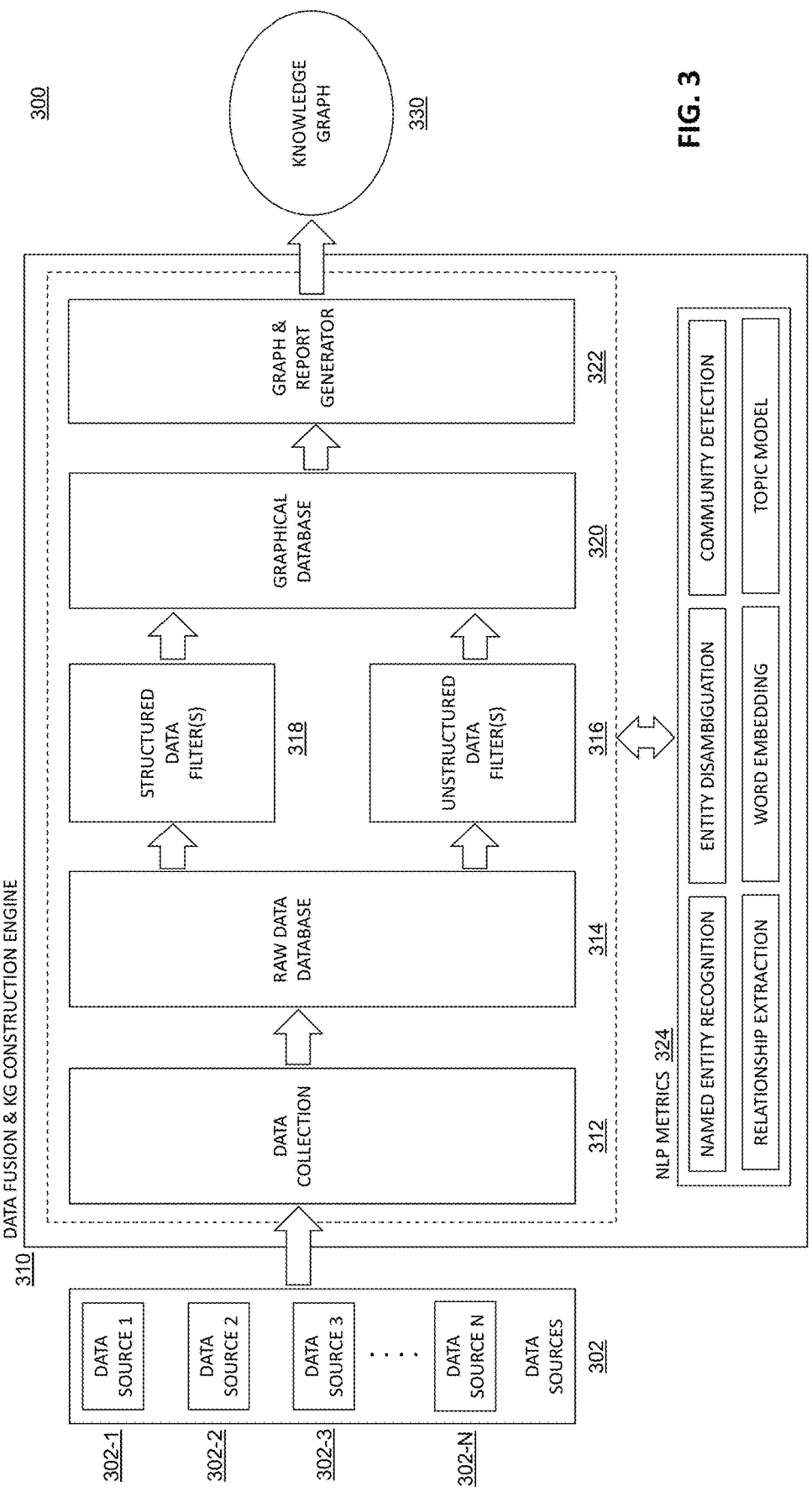
FIG. 3 illustrates a multi-source data fusion and knowledge graph construction system environment according to an illustrative embodiment.

FIG. 3 illustrates a multi-source data fusion and knowledge graph construction system environment 300 according to an illustrative embodiment. As shown, multi-source data 302 comprises data from a plurality of data sources 302-1, 302-2, 302-3, ..., 302-N. The multi-source data 302 is collected and processed, as will be further explained, by data fusion and knowledge graph (KG) construction engine 310 so as to generate a knowledge graph 330. Data fusion and KG construction engine 310 comprises a data collection module 312, a raw data database 314, one or more unstructured data filters 316, one or more structured data filters 318, a graphical database 320, a graph and report generator 322, and a set of natural language processing (NLP) metrics 324 including, but not limited to, named entity recognition model, entity disambiguation, community detection, relationship extraction, word embedding, and a topic model. One or more of these NLP metrics 324 are used in illustrative embodiments, as will be further explained below. Those of ordinary skill in the NLP art will understand their functionalities when not specifically described herein.

In one illustrative embodiment, the plurality of data sources 302-1, 302-2, 302-3, ..., 302-N may comprise, as mentioned above, an arXiv database, a Medium database, a GitHub database, and a Quora database. Each of these databases are accessible online, e.g., via respective websites over the Internet. Other web-based and/or non web-based data sources can be part of multi-source data 302.

In accordance with an illustrative environment and as will be explained below in further detail, data collection module 312 collects data (e.g., from respective websites arXiv, GitHub, Quora, and Medium) using a web crawler, and then stores the collected data in raw data database 314. Typical web crawling techniques can be employed by data collection module 312. Unstructured data from raw data database 314 is filtered by the one or more unstructured data filters 316, while structured data from raw data database 314 is filtered by the one or more structured data filters 318. For example, the one or more unstructured data filters 316 and the one or more structured data filters 318 respectively choose useful information from the raw data and the filtered information is directly used to construct an initial knowledge graph with sub-graphs for each data source 302-1, 302-2, 302-3, ..., 302-N. Note that one or more of the NLP metrics 324 can be used by the one or more unstructured data filters 316 to filter information from the unstructured raw data. An example will be described below in the context of FIG. 5A. All the filtered data is then stored in graphical database 320 (e.g., neo4j) and sub-graphs are fused to form a final comprehensive knowledge graph 330, as will be further explained below.

Figure 4:
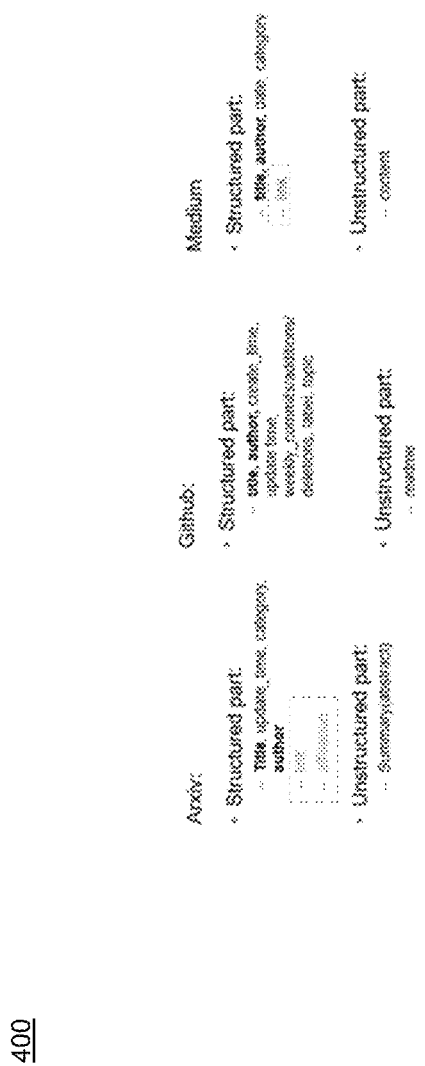
FIG. 4 illustrates results of data filtering according to an illustrative embodiment.

By way of example only, FIG. 4 illustrates results 400 of raw data filtering by the one or more unstructured data filters 316 and the one or more structured data filters 318 in order to respectively select information from data sources 302-1, 302-2, 302-3, ..., 302-N(e.g., arXiv, GitHub, and Medium) for use in the construction of knowledge graph 330. Note that all structured and unstructured information shown in results 400, with the exception of information surrounded by a dashed box, is considered useful for knowledge graph construction. For example, structured information such as a title and an author(s) of a piece of content from one of the data sources 302-1, 302-2, 302-3 ... 302-N is extracted by the one or more structured data filters 318 and can be used directly in a knowledge graph. However, unstructured information has to be further processed by the one or more unstructured data filters 316 (using one or more NLP metrics 324) to extract useful information for the knowledge graph 330. In alternative filtering embodiments, all or portions of the information in the dashed boxes in FIG. 4, as well as other information, may be considered useful for knowledge graph construction.

Figure 5B:
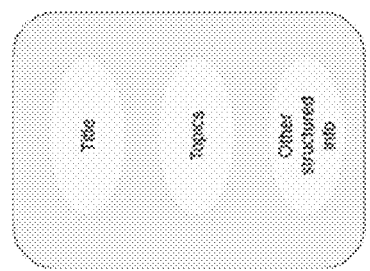
FIGS. 5A and 5B illustrate topic extraction for node assignment according to an illustrative embodiment.
Figure 5A:
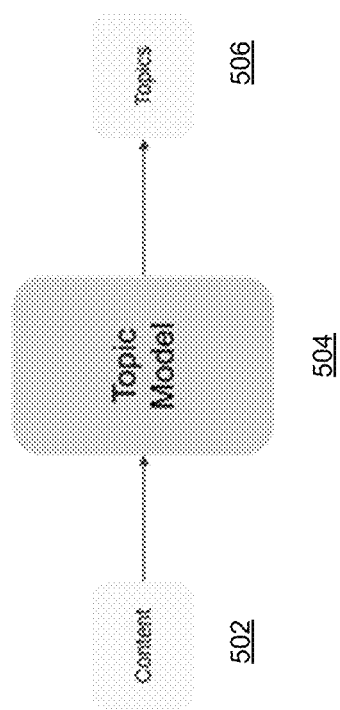

FIG. 5A illustrates an example of a topic extraction process 500 according to an illustrative embodiment. As shown, unstructured data represented as content 502 is presented to a topic model 504. An example of a topic model is one that applies LDA techniques as described above. The result is topics 506 that are then stored in graphical database 320 (e.g., neo4j) and used to form a final comprehensive knowledge graph 330. FIG. 5B illustrates an example 510 of name and properties for node assignment in the knowledge graph. More particularly, the system first uses topic model 504 to extract topics from the unstructured parts (e.g., summary, read me, etc.). These topics, along with the structured parts except title, become the properties of nodes, while the titles are the node names for each node. As mentioned above, these processes result in one or more sub-graphs being formed for each of the plurality of data sources 302-1, 302-2, 302-3, ... 302-N.

Figure 6:
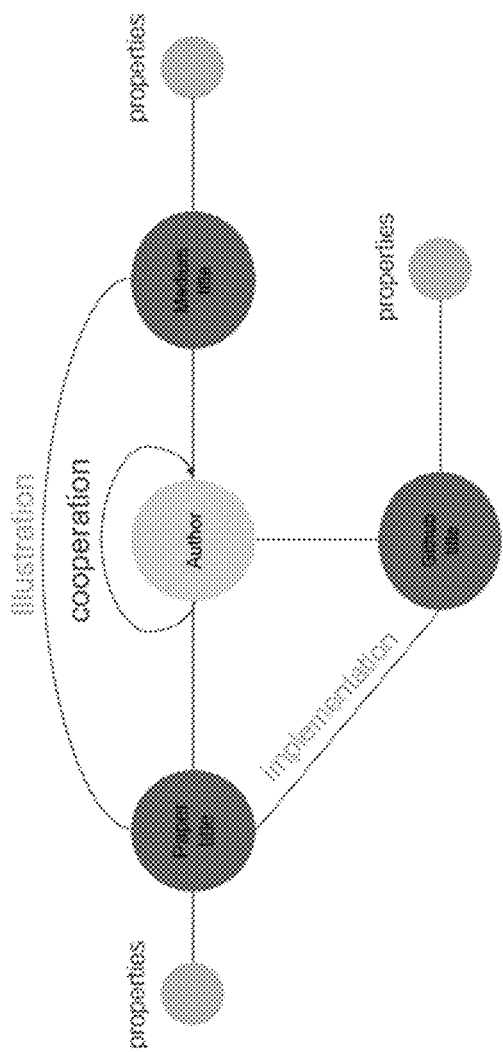
FIG. 6 illustrates a knowledge graph structure according to an illustrative embodiment.

Following sub-graph construction, the data fusion and KG construction engine 310 combines the sub-graphs into a comprehensive knowledge graph 330. This is accomplished by graph and report generator 322. An example of the fusion of sub-graphs associated with the different data sources (e.g., arXiv, GitHub, and Medium) is shown in FIG. 6 as knowledge graph structure 600. Because Medium content contains mainly the illustration blogs for papers submitted to arXiv, the related nodes in Medium content are considered the illustration of papers. Thus, the edge that connects a paper title node and a Medium node is labeled "illustration." GitHub codes are mainly the implementation of these papers, so a GitHub node and a paper title node have a relationship considered to be an implementation, and as such, the edge that connects a paper title node and a GitHub node is labeled "implementation."

Figure 7:
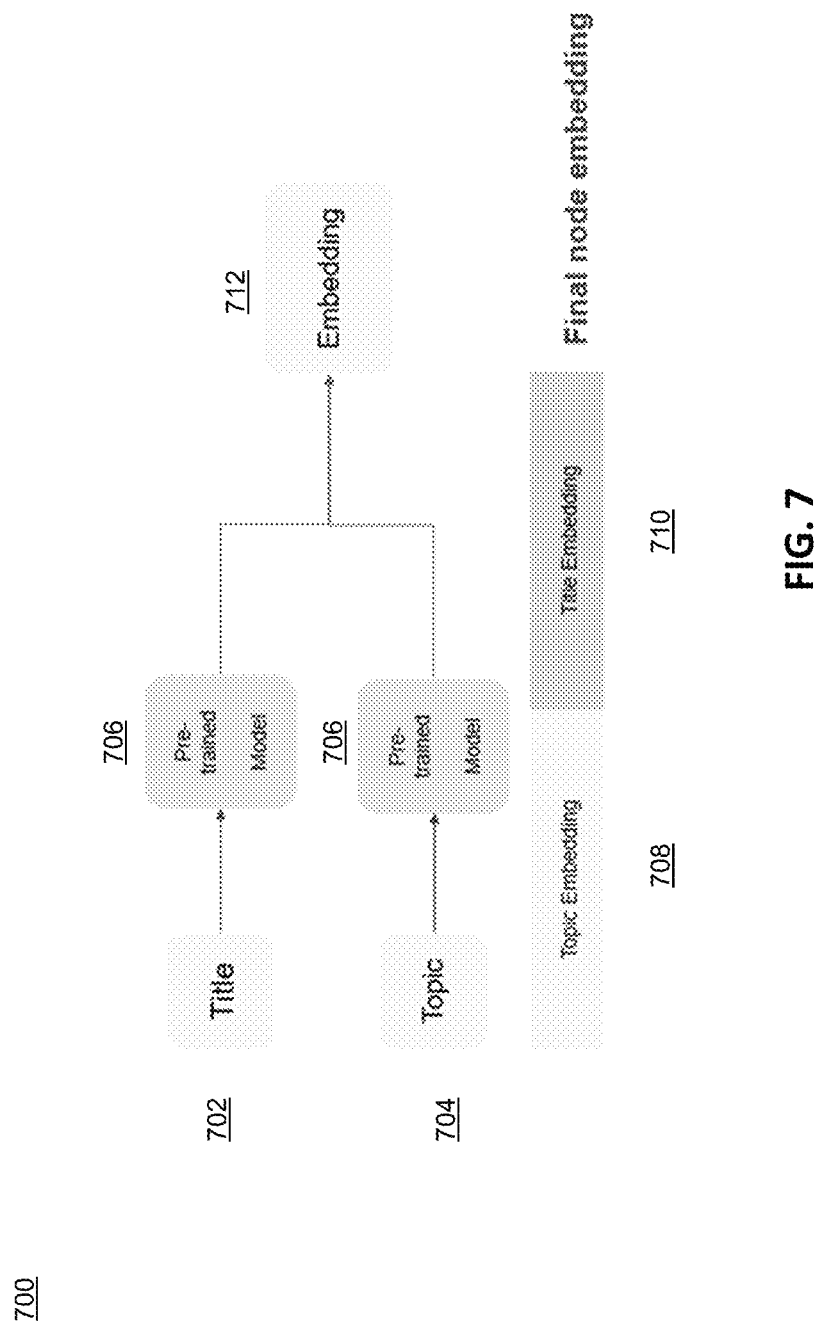
FIG. 7 illustrates an embedding calculation process according to an illustrative embodiment.
Figure 8:
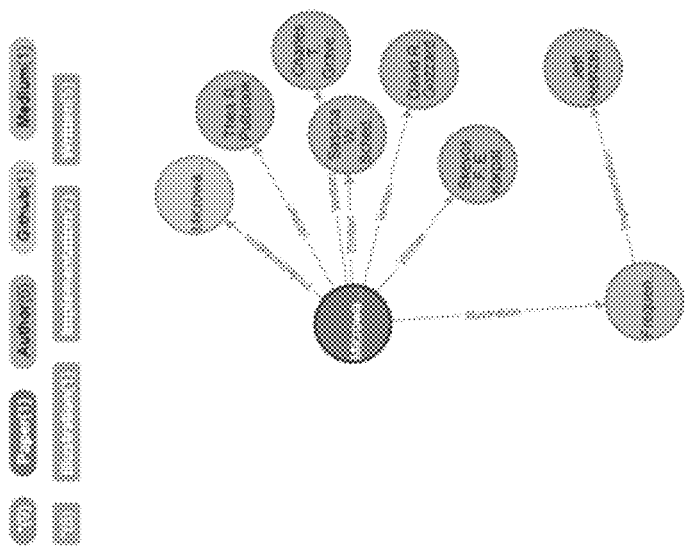
FIG. 8 illustrates a query associated with a knowledge graph structure according to an illustrative embodiment.

To measure the similarity between nodes in different sub-graphs, an embedding calculation process 700 illustrated in FIG. 7 is provided in accordance with an illustrative embodiment. Process 700 may be implemented in graph and report generator 322 in data fusion and KG construction engine 310. Because the main information which implies the relationships between nodes are included in the title and the topic, the system uses these two properties in each node to calculate the embedding. In general, node embedding computes low-dimensional vector representations of nodes in a graph. These vectors, also called embeddings, can be used for machine learning purposes. A main goal of node embedding is to encode nodes of a graph so that similarity in the embedding space (e.g., dot product) approximates similarity in the original data represented by the graph. For efficiency, in one illustrative embodiment, the system directly uses a pre-trained model 706 (e.g., BERT or Bidirectional Encoder Representations for Transformers, which is a machine learning technique for NLP pre-training that was developed by Google) to get the embedding for the title 702 and topic 704 respectively, then concatenates these two embeddings 708 and 710 to get the final embedding 712. During this process, if topics come from a topic model (e.g., FIG. 5B), topic embedding 708 is derived from a weighted topic word embedding. If topics come from data, topic embedding 708 is the average of the topic word embedding. Sentence embedding is derived from the classification [CLS] token in BERT. Final embedding 712 is the concatenation of the two embeddings 708 and 710. Then, the graph and report generator 322 uses cosine similarity to measure the distance between nodes. If the distance is relatively small (e.g., at or below a given distance threshold value), then graph and report generator 322 adds an edge between these two nodes. If the nodes are from paper and medium (e.g., FIG. 6), then the name of this edge is "illustration." If the nodes are from paper and github (e.g., FIG. 6), then the name becomes "implementation." FIG. 8 shows a portion of a comprehensive knowledge graph 800 formed in accordance with a single query from graph and report generator 322 to graphical database 320.

Note that the reporting generation portion of graph and report generator 322 is configured to generate reports or other information with one or more of recommendations, predictions, trends, etc. that are based on the information in knowledge graph 330. Technology companies and/or other automated systems can then utilize these reports to make informed decisions and/or computations.

Advantageously, illustrative embodiments provide a comprehensive constructed knowledge graph which can be used in many downstream tasks such as, but not limited to, a recommendation system, a prediction system, etc. In one embodiment, FIG. 6, the comprehensive knowledge graph incorporates papers, codes and blogs, which are main information resources for technologies. In constructing the comprehensive knowledge graph, illustrative embodiments filter raw data from such data sources (papers, codes and blogs) to find the useful information. Illustrative embodiments propose a node design with complex properties, as well as a node embedding calculation methods. For example, illustrative embodiments provide a knowledge graph fusion framework based on a knowledge graph structure design (e.g., FIG. 6), and node embedding is used to measure the similarity between nodes.

Figure 9:
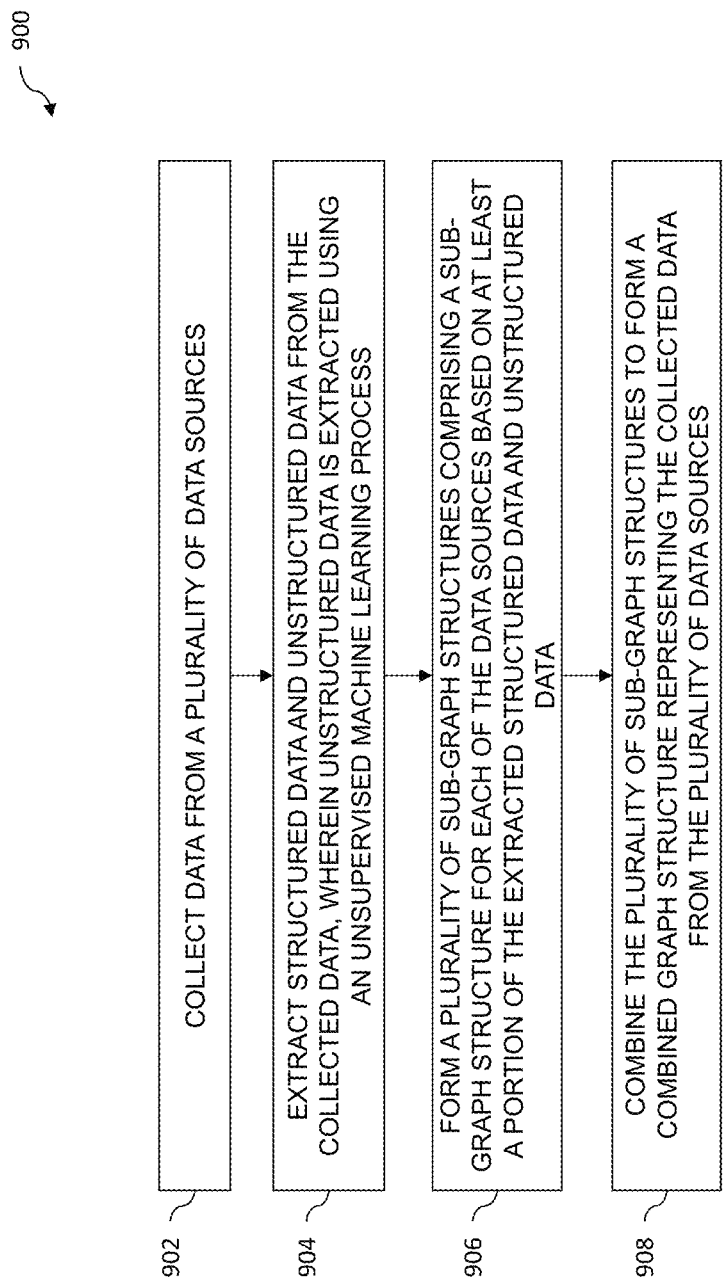
FIG. 9 illustrates a methodology for constructing a knowledge graph according to an illustrative embodiment.

FIG. 9 illustrates a methodology 900 for constructing a graph structure according to an illustrative embodiment. Step 902 collects data from a plurality of data sources. Step 904 extracts structured data and unstructured data from the collected data, wherein unstructured data is extracted using an unsupervised machine learning process. Step 906 forms a plurality of sub-graph structures comprising a sub-graph structure for each of the data sources based on at least a portion of the extracted structured data and unstructured data. Step 908 combines the plurality of sub-graph structures to form a combined graph structure representing the collected data from the plurality of data sources. The resulting combined graph structure is a comprehensive knowledge graph.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for constructing and otherwise managing knowledge graphs will now be described in greater detail with reference to FIGS. 10 and 11. Although described in the context of knowledge graph construction system environment 300, these platforms may also be used to implement at least portions of other information processing systems in other embodiments.

Figure 10:
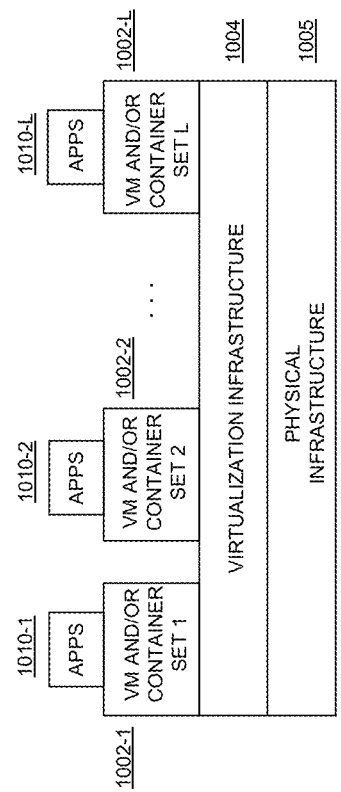
FIGS. 10 and 11 show examples of processing platforms that may be utilized to implement at least a portion of an information processing system with knowledge graph management functionalities according to one or more illustrative embodiments.
Figure 11:
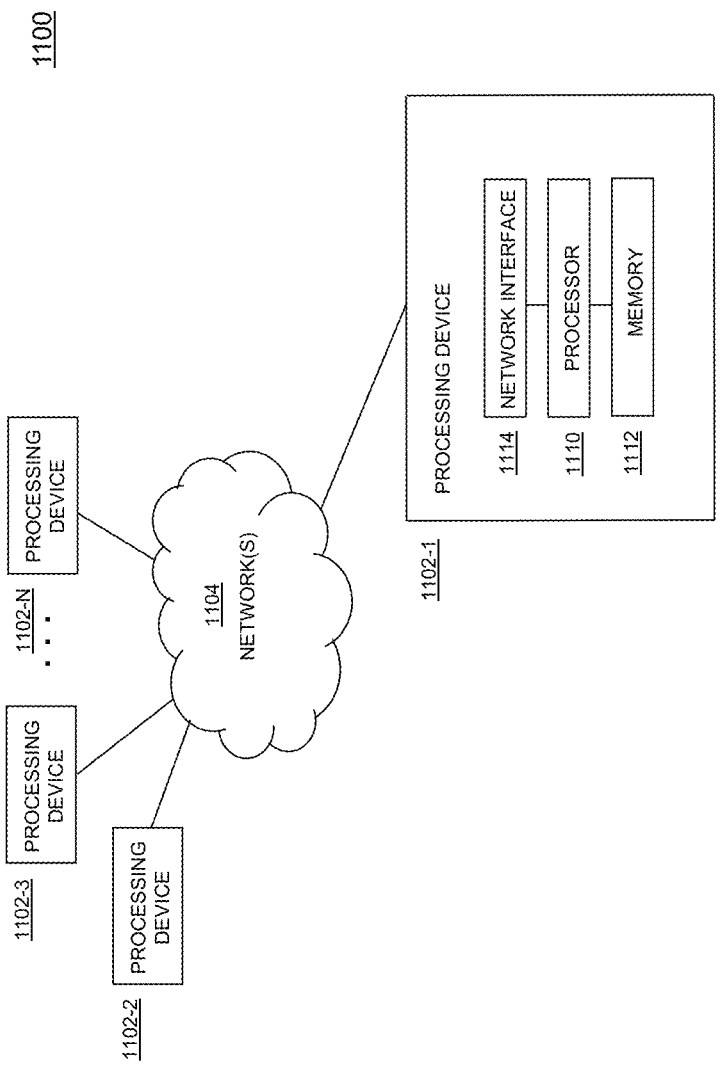

FIG. 10 shows an example processing platform comprising cloud infrastructure 1000. The cloud infrastructure 1000 comprises a combination of physical and virtual processing resources that may be utilized to implement at least a portion of the knowledge graph construction system environment 300. The cloud infrastructure 1000 comprises multiple container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure.

The cloud infrastructure 1000 further comprises sets of applications 1010-1, 1010-2, . . . 1010-L running on respective ones of the container sets 1002-1, 1002-2, . . . 1002-L under the control of the virtualization infrastructure 1004. The container sets 1002 may comprise respective sets of one or more containers.

In some implementations of the FIG. 10 embodiment, the container sets 1002 comprise respective containers implemented using virtualization infrastructure 1004 that provides operating system level virtualization functionality, such as support for Kubernetes-managed containers.

As is apparent from the above, one or more of the processing modules or other components of knowledge graph construction system environment 300 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of elements 100/300 and includes a plurality of processing devices, denoted 1102-1, 1102-2, 1102-3, . . . 1102-N, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and knowledge graph construction system environment 300 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to at least one memory, the at least one processing platform, when executing program code, is configured to:
   collect data from a plurality of data sources;
   extract structured data and unstructured data from the collected data using an unsupervised machine learning model, wherein the extracting comprises:
   selecting and processing a portion of the unstructured data using one or more unstructured data filters based on one or more natural language processing metrics;
   selecting a portion of the structured data using one or more structured data filters; and
   applying the unsupervised machine learning model to the selected and processed portion of the unstructured data to determine one or more topics of the unstructured data;
   form a plurality of sub-graph structures comprising a sub-graph structure for each of the data sources based on at least the selected portion of the structured data and the selected and processed portion of the unstructured data;
   compute, for a given node of a given sub-graph structure, a title embedding based on a title portion of the selected portion of structured data and a topic embedding based on the one or more topics of the unstructured data and one or more other portions of the selected portion of the structured data;
   combine the plurality of sub-graph structures to form a combined graph structure representing the collected data from the plurality of data sources, wherein combining the plurality of sub-graph structures to form a combined graph structure further comprises:
   using a graph and report generator to measure a distance between two nodes and adding an edge between the two nodes when the distance is at or below a given distance threshold value; and
   apply the combined graph structure to one or more user tasks.

2. The apparatus of claim 1, wherein extracting structured data from the collected data further comprises identifying one or more titles of content in the collected data for the plurality of data sources.

3. The apparatus of claim 1, wherein the extracting further comprises saving the selected portion of structured data and the determined one or more topics to a graphical database to form the plurality of sub-graph structures.

4. The apparatus of claim 1, wherein the unsupervised machine learning model comprises a Latent Dirichlet Allocation model.

5. The apparatus of claim 1, wherein combining the plurality of sub-graph structures to form a combined graph structure further comprises labelling the added edge based on the sources of the nodes.

6. The apparatus of claim 1, wherein combining the plurality of sub-graph structures to form a combined graph structure further comprises concatenating the title embedding and the topic embedding to obtain a final node embedding for the given node.

7. The apparatus of claim 6, wherein when a given one of the determined one or more topics is extracted via a topic model, the topic embedding is derived from a weighted version of a topic word embedding.

8. The apparatus of claim 7, wherein when the given one of the determined one or more topics is extracted directly from the collected data, the topic embedding is derived from an averaged version of the topic word embedding.

9. A method comprising:
   collecting data from a plurality of data sources;
   extracting structured data and unstructured data from the collected data using an unsupervised machine learning model, wherein the extracting comprises:
   selecting and processing a portion of the unstructured data using one or more unstructured data filters based on one or more natural language processing metrics;

selecting a portion of the structured data using one or more structured data filters; and applying the unsupervised machine learning model to the selected and processed portion of the unstructured data to determine one or more topics of the unstructured data;

forming a plurality of sub-graph structures comprising a sub-graph structure for each of the data sources based on at least the selected portion of the structured data and the selected and processed portion of the unstructured data;

computing, for a given node of a given sub-graph structure, a title embedding based on a title portion of the selected portion of structured data and a topic embedding based on the one or more topics of the unstructured data and one or more other portions of the selected portion of the structured data;

combining the plurality of sub-graph structures to form a combined graph structure representing the collected data from the plurality of data sources, wherein combining the plurality of sub-graph structures to form a combined graph structure further comprises:

using a graph and report generator to measure a distance between two nodes and adding an edge between the two nodes when the distance is at or below a given distance threshold value; and applying the combined graph structure to one or more user tasks;

wherein the method is executed by at least one processing platform comprising at least one processor coupled to at least one memory configured to execute program code.

10. The method of claim 9, wherein the extracting further comprises saving the selected portion of structured data and the determined one or more topics to a graphical database to form the plurality of sub-graph structures.

11. The method of claim 9, wherein the unsupervised machine learning model comprises a Latent Dirichlet Allocation model.

12. The method of claim 9, wherein extracting structured data from the collected data further comprises identifying one or more titles of content in the collected data for the plurality of data sources.

13. The method of claim 9, wherein combining the plurality of sub-graph structures to form a combined graph structure further comprises concatenating the title embedding and the topic embedding to obtain a final node embedding for the given node.

14. The method of claim 13, wherein when a given one of the determined one or more topics is extracted via a topic model, the topic embedding is derived from a weighted version of a topic word embedding, and further wherein when the given one of the determined one or more topics is extracted directly from the collected data, the topic embedding is derived from an averaged version of the topic word embedding.

15. The method of claim 13, wherein combining the plurality of sub-graph structures to form a combined graph structure further comprises:

labelling the added edge based on the sources of the nodes.

16. A computer program product comprising a non-transitory processor-readable storage medium having stored therein program code of one or more software programs, wherein the program code when executed by at least one processing platform causes the at least one processing platform to:

collect data from a plurality of data sources;

extract structured data and unstructured data from the collected data using an unsupervised machine learning model, wherein the extracting comprises:

selecting and processing a portion of the unstructured data using one or more unstructured data filters based on one or more natural language processing metrics;

selecting a portion of the structured data using one or more structured data filters; and applying the unsupervised machine learning model to the selected and processed portion of the unstructured data to determine one or more topics of the unstructured data;

form a plurality of sub-graph structures comprising a sub-graph structure for each of the data sources based on at least the selected portion of the structured data and the selected and processed portion of the unstructured data;

compute, for a given node of a given sub-graph structure, a title embedding based on a title portion of the selected portion of structured data and a topic embedding based on the one or more topics of the unstructured data and one or more other portions of the selected portion of the structured data;

combine the plurality of sub-graph structures to form a combined graph structure representing the collected data from the plurality of data sources, wherein combining the plurality of sub-graph structures to form a combined graph structure further comprises:

using a graph and report generator to measure a distance between two nodes and adding an edge between the two nodes when the distance is at or below a given distance threshold value; and apply the combined graph structure to one or more user tasks.

17. The computer program product of claim 16, wherein the combined graph structure representing the collected data from the plurality of data sources is a knowledge graph.

18. The computer program product of claim 16, wherein extracting structured data from the collected data further comprises identifying one or more titles of content in the collected data for the plurality of data sources.

19. The computer program product of claim 16, wherein the extracting further comprises saving the selected portion of structured data and the determined one or more topics to a graphical database to form the plurality of sub-graph structures.

20. The computer program product of claim 16, wherein the combining the plurality of sub-graph structures to form a combined graph structure further comprises labelling the added edge based on the sources of the nodes.

* * * * *